United States Patent
Delisle et al.

(10) Patent No.: US 8,205,697 B2
(45) Date of Patent: Jun. 26, 2012

(54) METHOD FOR CONTROLLING A HYBRID VEHICLE FOR RECHARGING THE ELECTRIC ENERGY STORAGE MEANS AND HYBRID VEHICLE

(75) Inventors: Xavier Delisle, Guyancourt (FR); David Calmels, Poissy (FR); Vincent Basso, Briis sous Forges (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 511 days.

(21) Appl. No.: 12/514,059

(22) PCT Filed: Oct. 29, 2007

(86) PCT No.: PCT/FR2007/052270
§ 371 (c)(1),
(2), (4) Date: May 7, 2009

(87) PCT Pub. No.: WO2008/056076
PCT Pub. Date: May 15, 2008

(65) Prior Publication Data
US 2010/0000808 A1    Jan. 7, 2010

(30) Foreign Application Priority Data
Nov. 7, 2006 (FR) ...................................... 06 54752

(51) Int. Cl.
*B60W 10/08* (2006.01)
(52) U.S. Cl. ............................... 180/65.265; 180/65.285
(58) Field of Classification Search .................. 180/242, 180/243, 65.23, 65.235, 65.26, 65.265, 65.6
See application file for complete search history.

(56) References Cited

U.S. PATENT DOCUMENTS

| | | | | |
|---|---|---|---|---|
| 5,495,906 A | * | 3/1996 | Furutani | 180/65.23 |
| 5,810,106 A | * | 9/1998 | McCoy | 180/243 |
| 6,059,064 A | * | 5/2000 | Nagano et al. | 180/243 |

(Continued)

FOREIGN PATENT DOCUMENTS

EP    1236603 A    9/2002

*Primary Examiner* — Jeffrey J Restifo
(74) *Attorney, Agent, or Firm* — Nicolas E. Seckel

(57) ABSTRACT

The invention relates to a method comprising: a thermal traction chain (50) including a front axle (12), a thermal engine (18) coupled by a coupling member (20) to a gearbox (22) for transmitting to the front axle (12) and via a front transmission (24) a vehicle traction power for different gear reduction ratios of the gearbox, at least one front electric machine (42, 46) coupled to the thermal engine (18) and ensuring at least the starting thereof, an electric traction chain (60) including a rear axle (62), at least one rear electric machine (68) mechanically coupled via a rear transmission (70) to the rear axle (62), at least one power electric network (74) connecting the rear electric machine (68) to electric energy storage means (40), and control means (44) for driving the thermal traction chain (50), the electric traction chain (60), and the electric energy storage means (40) in order to take into account all the life situations of the vehicle. The method comprises driving the thermal traction chain (50), the electric traction chain (60), and the electric energy storage means (40) via the control means (44) in order to transmit the power provided by the thermal traction chain (50) through the road (RT) on which the vehicle is rolling to the electric traction chain (60) for recharging the electric energy storage means (40).

9 Claims, 2 Drawing Sheets

U.S. PATENT DOCUMENTS

| | | | |
|---|---|---|---|
| 6,401,849 B1 * | 6/2002 | Seguchi et al. | 180/65.6 |
| 6,419,040 B2 * | 7/2002 | Kitano et al. | 180/243 |
| 6,435,296 B1 * | 8/2002 | Arai | 180/243 |
| 6,540,035 B2 * | 4/2003 | Nagano et al. | 180/65.21 |
| 6,880,654 B2 * | 4/2005 | Plishner | 180/65.6 |
| 6,880,664 B2 * | 4/2005 | Pecnik et al. | 180/243 |
| 6,945,347 B2 * | 9/2005 | Matsuno | 180/242 |
| 7,000,717 B2 * | 2/2006 | Ai et al. | 180/65.235 |
| 7,134,517 B1 * | 11/2006 | Kaiser et al. | 180/65.6 |
| 7,178,617 B2 * | 2/2007 | Morisawa et al. | 180/65.265 |
| 7,216,943 B2 * | 5/2007 | Nishikawa et al. | 303/152 |
| 7,234,553 B2 * | 6/2007 | Shimizu et al. | 180/65.25 |
| 7,237,639 B2 * | 7/2007 | Kowatari et al. | 180/243 |
| 7,264,070 B2 * | 9/2007 | Shimizu | 180/65.25 |
| 7,296,648 B2 * | 11/2007 | Tatara et al. | 180/242 |
| 7,383,902 B2 * | 6/2008 | Matsuzaki et al. | 180/65.285 |
| 7,455,133 B2 * | 11/2008 | Kaneko et al. | 180/65.285 |
| 7,533,754 B2 * | 5/2009 | Burrows et al. | 180/248 |
| 7,559,397 B2 * | 7/2009 | Yang | 180/242 |
| 7,591,339 B2 * | 9/2009 | Sugimoto et al. | 180/242 |
| 7,607,505 B2 * | 10/2009 | Yang | 180/242 |
| 7,634,344 B2 * | 12/2009 | Masuda et al. | 701/69 |
| 7,669,683 B2 * | 3/2010 | Yang | 180/242 |
| 7,726,430 B2 * | 6/2010 | Yang | 180/242 |
| 7,729,842 B2 * | 6/2010 | Sugita | 701/84 |
| 7,774,108 B2 * | 8/2010 | Nakasako et al. | 701/22 |
| 7,874,389 B2 * | 1/2011 | Feliss et al. | 180/65.21 |
| 7,980,349 B2 * | 7/2011 | Sato | 180/242 |
| 8,008,791 B2 * | 8/2011 | Yamakado et al. | 290/4 C |
| 2002/0007974 A1 | 1/2002 | Nagano et al. | |
| 2002/0123407 A1 | 9/2002 | Hanyu et al. | |
| 2002/0139592 A1 | 10/2002 | Fukasaku et al. | |

* cited by examiner

METHOD FOR CONTROLLING A HYBRID VEHICLE FOR RECHARGING THE ELECTRIC ENERGY STORAGE MEANS AND HYBRID VEHICLE

The invention relates to vehicles of the type that have a conventional traction drive with an engine transmission unit (or ETU) comprising a so-called combustion drivetrain with a heat engine on the front wheel axle unit of the vehicle, and an electric drivetrain on the rear wheel axle unit comprising at least one electric machine.

Figure 1:
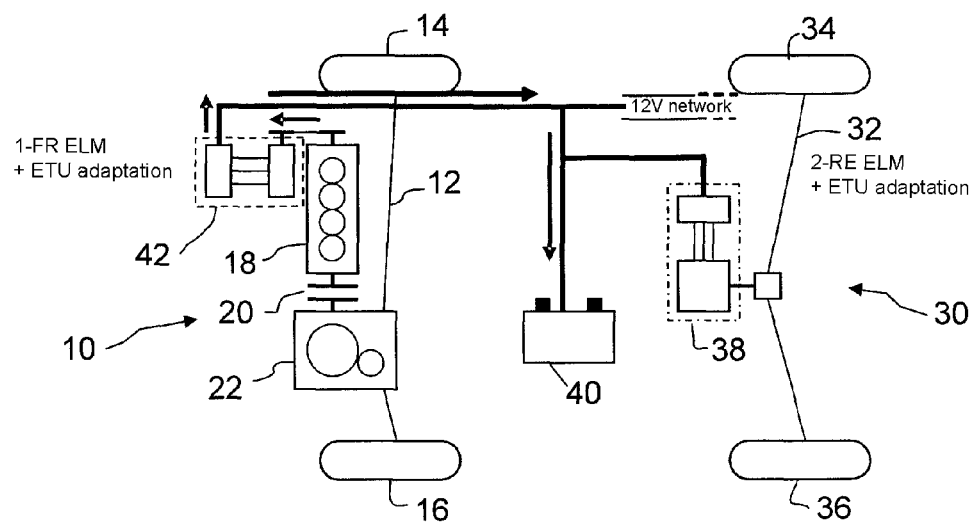

FIG. 1 shows a simplified architecture of such a vehicle, described below as a hybrid vehicle: a heat engine and an electric machine on the front wheel axle unit cooperate with an electric machine on the rear wheel axle unit.

The hybrid vehicle in FIG. 1 has a conventional traction drive, or combustion drivetrain 10, having a front wheel axle unit 12 comprising two front drive wheels 14, 16 rotationally driven with the torque provided by the heat engine 18 via a coupling member, e.g., a clutch 20, and a gearbox 22.

A front electric machine 42 is coupled to the heat engine and used at least for restarting it.

The hybrid vehicle also has an electric drivetrain 30 on the rear wheel axle unit 32 of the vehicle, comprising two rear drive wheels 34, 36 mechanically coupled to an electric traction machine 38.

The electric drivetrain 30 is electrically coupled to electrical energy storage means 40.

Hereinafter, the term "battery" will be used to indicate any means for storing electrical energy (storage battery or battery pack, super capacitor, etc.).

The vehicle body is mechanically connected to the front and rear wheel axle units of the vehicle by suspension devices not shown in the figure.

On a state-of-the-art hybrid vehicle equipped electric rear drivetrain, the means used for recharging the energy storage battery 40 with the heat engine 18 is an electric machine mechanically coupled to the heat engine. To handle this scenario, a second electric machine must therefore be included with the front ETU (front drivetrain), with enough electrical generation capacity to recharge the battery as a complement to the rear drive train.

Installing a second electric machine has the disadvantage of increasing the cost of the vehicle, and moreover, this addition poses problems due to thincreased dimensional constraints in the engine compartment.

In order to avoid introducing a second, high-capacity electric machine into the ETU, the invention proposes a hybrid vehicle control method, comprising:
   a combustion drivetrain comprising a front wheel axle unit, a heat engine coupled by a coupling member to a gearbox intended to transmit vehicle traction power for various gearbox reduction ratios through a front transmission to the front wheel axle unit, and at least one front electric machine coupled to the heat engine, used at least for restarting it,
   an electric drivetrain comprising a rear wheel axle unit and at least one rear electric machine mechanically coupled to the rear wheel axle unit through a rear transmission,
   at least one electrical power network connecting the rear electric machine to electrical energy storage means,
   a control means for controlling the combustion drivetrain, the electric drivetrain, and the electrical energy storage means, for taking all the vehicle life scenarios into account,
characterized in that it consists of controlling the combustion drivetrain, the electric drivetrain and the energy storage means via the control means in order to transmit power provided by the combustion drivetrain to the electric drivetrain, via the road (RD) on which the vehicle is traveling, for recharging the energy storage means.

Advantageously, when the vehicle is in motion and being driven by the heat engine, the method consists in controlling the rear electric machine so as to draw part of the vehicle's traction power, supplied by the vehicle's heat engine, through the rear wheel axle unit of the vehicle.

In an embodiment, the method consists of:
   in a first step, configuring the rear electric machine as an electrical current generator, and using the induced resisting torque to transform the resisting torque into electrical power to recharge the energy storage means via the electrical power network.
   in a second step, controlling the combustion drivetrain so that it provides the necessary traction power to maintain the speed and acceleration requested by the driver and recharge the energy storage means as well.

In this embodiment, the method consists of controlling the combustion drivetrain so as to offset the resisting torque, the total losses at the front and rear transmissions, and the losses due to the front- and rear-wheel tires.

In another embodiment of the method, when the heat engine is used by the driver at its maximum power potential, the method has a step of stopping the recharging of the energy storage means by the rear electric machine.

In this other embodiment of the method, the step of stopping the recharging of the energy storage means has the following steps, which consist of:
   in a first step, controlling the rear electric machine so as to stop drawing resisting torque from the rear wheel axle;
   in a second step, controlling the combustion drivetrain so as to provide the necessary traction power to maintain the speed and acceleration requested by the driver.

The control method according to the invention for a hybrid vehicle is based on a strategy that consists of transmitting power, via the road on which the vehicle is traveling, from the ETU to the electric machine associated with the rear electric drivetrain in order to recharge the battery. This strategy is implemented by a control method for the hybrid vehicle that depends on vehicle life scenarios, based in particular on the power requested from the heat engine by the driver.

In an operating mode of the hybrid vehicle according to the invention, it may be necessary to recharge the battery with a set power. The rear electric machine is then controlled so as to draw a mechanical power (or resisting torque) from the rear wheel axle unit of the vehicle, and to transform this mechanical power into electrical power for recharging the battery.

This mechanical power drawn from the rear wheel axle unit for recharging the battery tends to slow the vehicle down, and the heat engine must then be controlled in order to offset this deceleration and provide an additional mechanical power in such a way that the vehicle can maintain the speed and acceleration requested by the driver, and do so in a way that is transparent to the driver.

The invention also relates to a hybrid vehicle for carrying out the control method according to the invention, characterized in that it comprises:
   a combustion drivetrain comprising a front wheel axle unit, a heat engine coupled by a coupling member to a gearbox intended to transmit traction power for various gearbox reduction ratios to the front wheel axle unit, and at least one front electric machine coupled to the heat engine, which is used at least for restarting it, an electric drivetrain comprising a rear wheel axle unit and at least one rear electric machine mechanically coupled to the rear wheel axle unit through a rear transmission, at least one electrical power network connecting the rear electric machine to electrical energy storage means, a control means for controlling the combustion drivetrain, the electric drivetrain, and the electrical energy storage means, for taking all the vehicle life scenarios into account.

Figure 2:
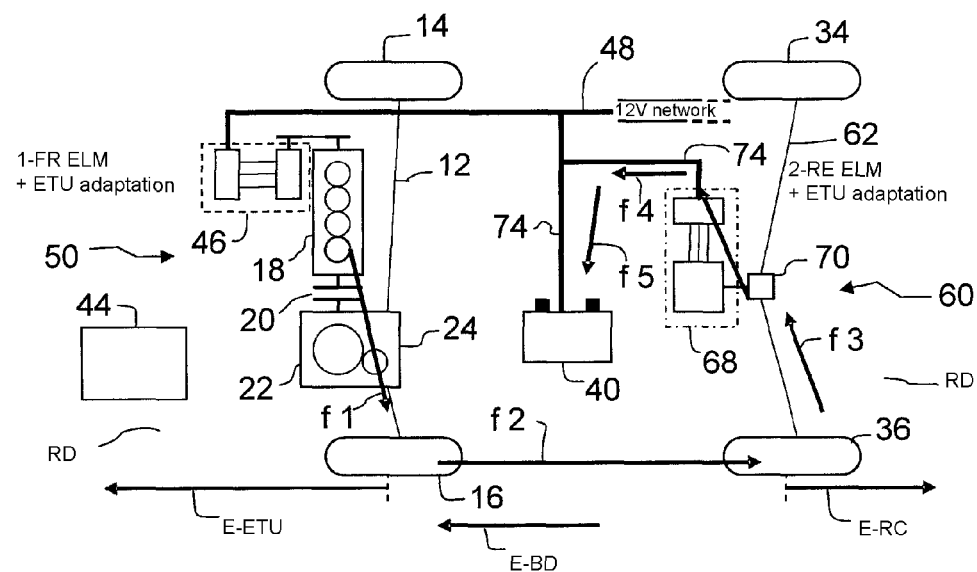
Figure 3:
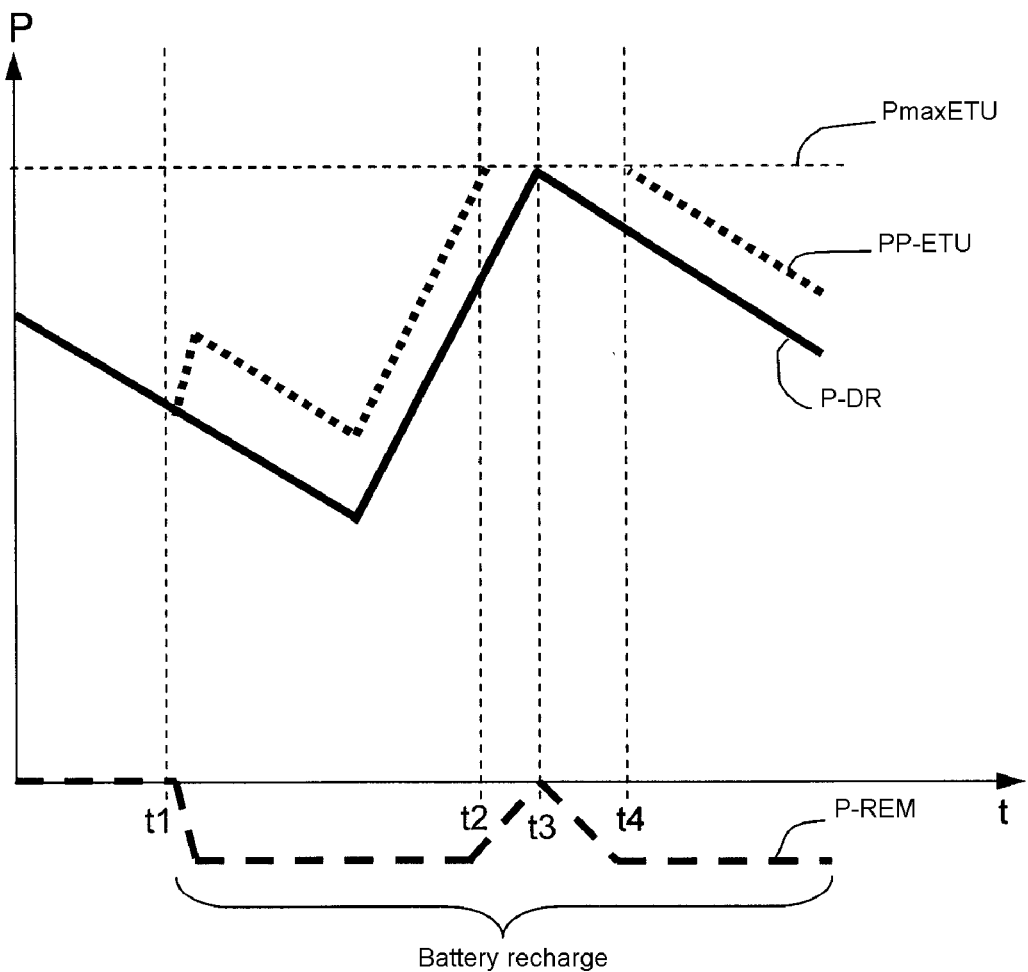

The invention will be more easily understood by describing the method for carrying out the control strategy of a hybrid vehicle, with reference to the indexed figures, in which:

FIG. 1, already described, shows a simplified architecture of a state-of-the-art hybrid vehicle;

FIG. 2 shows a hybrid vehicle for carrying out the control method according to the invention; and FIG. 3 shows power curves as a function of time for the elements of the vehicle in FIG. 2.

In these figures, the same references are used to designate the same elements.

FIG. 2 shows an example of a hybrid vehicle that implements the control method according to the invention.

The hybrid vehicle in FIG. 2 has a conventional combustion drivetrain 50. This combustion drivetrain comprises a front wheel axle unit 12, a heat engine 18 coupled by a clutch 20 to a mechanical gearbox 22 intended to transmit vehicle traction power for various reduction ratios of the gearbox 22 through a front transmission 24 to the front wheel axle unit 12. A front electric machine 46 is mechanically coupled to the heat engine 18 to enable it to start and to provide a power current through a distribution network 48 to the electrical equipment of the vehicle, in particular.

The hybrid vehicle additionally comprises an electric drivetrain 60 that has a rear wheel axle unit 62, with rear wheels 34, 36.

A rear electric machine 68 is mechanically coupled to the rear wheel axle unit 62 through a rear transmission 70.

"Transmission" is generally understood as a differential, or differential bridge, associated with the transmission shafts connected to the wheels.

An electrical power network 74 connected to the distribution network 48 connects the rear electric machine 68 to the energy storage battery 40.

The hybrid vehicle has the usual vehicle controls, such as an acceleration control, e.g., an accelerator pedal, and a brake control, e.g., a brake pedal, which are not shown.

The architecture of the hybrid vehicle shown in FIG. 2 for carrying out the method additionally comprises a control means 44, e.g., a management unit for the traction drive, which makes it possible to control the combustion drivetrain 50, the rear electric drivetrain 60, and the battery 40 in order to respond to various vehicle control strategies linked to the various life scenarios of said vehicle.

These strategies are implemented by the control method for a hybrid vehicle described below.

In a first scenario, when the hybrid vehicle is traveling on a road RD and driven by the heat engine 18 alone, the power generated by the heat engine is related to the driver's request, i.e., depressing the accelerator pedal.

If it is necessary to recharge the battery 40 with a set power, the control strategy in this scenario has a step for recharging the battery 40 through the rear electric machine 68.

To this end, the vehicle control method consists of:

in a first step, configuring the rear electric machine 68 as an electrical current generator, which then has a resisting torque at the rear wheel axle unit 62. Next, the rear electric machine transforms this resisting torque into electrical power for recharging the battery 40 via the electrical power network 74. The resisting torque thus acts against the engine torque produced by the front drive wheels 14, 16 of the vehicle, which tends to slow the vehicle down.

in a second step, controlling the ETU, and thus the heat engine 18 so that it provides the necessary traction power to maintain the speed and acceleration requested by the driver and recharge the battery 40 as well.

In this second step, in addition to the torque needed for the vehicle's traction, the heat engine has to provide an additional torque (or additional power) to offset the resisting torque generated by the rear wheel axle and recharge the battery 40.

FIG. 2 illustrates this first scenario:

The arrow f1 shows the transmission of power from the heat engine to the front wheels 14, 16 of the vehicle traveling on a road RD.

The force exerted on the road RD by the vehicle's front wheels 14, 16, which are driven by the heat engine 18 as a result of the friction between the wheels and the road, produces the vehicle's movement and consequently the movement of the rear wheel axle unit, which, like the front wheel axle unit, is integral with the vehicle body, thereby driving the rear wheels 34, 36, which are also in contact with the road RD.

Thus, there is a transfer of energy between the front wheel axle unit and the rear wheel axle unit via the road (arrow f2).

The arrow f3 shows the transmission of energy from the rear wheels 34, 36 to the rear electric machine 68 via the rear wheel axle unit 62 and the rear transmission 70.

The rear electric machine 68, which is rotationally driven by the rear wheels, supplies electrical energy to the battery 40 via the electric power network 74 in a direction of transfer shown by the arrows f4 and f5.

Also shown in FIG. 2 are the various forces being exerted on the hybrid vehicle:

a force E-ETU transmitted by the ETU in the direction of the vehicle's movement;

a resultant force E-BD on the body in the direction of the vehicle's movement; and a force E-RC generated by the rear wheel axle unit from energy recovery by the rear electric machine in the direction opposite the vehicle's movement.

The additional power provided by the heat engine 18 in this scenario to obtain the resisting torque is determined from the power drawn by the rear electric machine 68 (the resisting torque) plus all of the losses at the front 24 and rear 70 transmissions and the losses of the tires on the front 14, 16 and rear 34, 36 wheels.

In a second scenario, when the vehicle is in motion and being driven by the heat engine 18, if the heat engine 18 is being used by the driver at its maximum power potential, then it is no longer possible to recharge the battery 40 via the rear electric machine 68 without diminishing the vehicle's response to driver demands.

In this second scenario, the control method stops the recharging of the battery 40 through the rear electric machine 68.

To this end, the vehicle control method consists of:

in a first step, controlling the rear electric machine 68 so as to stop drawing resisting torque from the rear wheel axle 62.

The rear electric machine 68 is no longer providing current for recharging the battery 40. No resisting torque is acting against the torque provided by the heat engine 18; this way, the vehicle has its maximum motive power capacity available.

in a second step, controlling the heat engine 18 so as to provide, via the ETU and therefore the heat engine 18, the necessary traction power to maintain the speed and acceleration requested by the driver.

In these two scenarios, the control method according to the invention is carried out, and is completely transparent to the driver.

FIG. 3 illustrates the various steps of the method according to the invention by observing the change over time in power. The solid-line curve shows the power requested by the driver P-DR.

The dotted-line curve shows the total power PP-ETU provided by the ETU to the front wheel axle unit.

The dashed-line curve shows the power P-REM drawn by the rear electric machine 68 for recharging the battery 40.

Before time t1, the rear electric machine 68 is not providing current to recharge the battery; the total power provided by the ETU is the power requested by the driver P-DR.

At time t1 (the recharge step), the recharging of the battery is undertaken. The total power provided by the ETU starting at time t1 is the power requested by the driver P-DR plus the power P-REM drawn by the rear electric machine to recharge the battery, aside from the various losses.

Between time t1 and a subsequent time t2, the power requested by the driver P-DR plus the power P-REM drawn by the rear electric machine 68 is less than the maximum power PmaxETU of the heat engine 18; the rear electric machine is recharging the battery 40 with a predefined nominal current value.

After time t2, the power requested by the driver P-DR plus the power drawn by the rear electric machine 68 exceeds the maximum power PmaxETU deliverable by the heat engine 18; the recharging of the battery is progressively decreased in order to maintain the total power provided by the heat engine 18 at its maximum power PmaxETU until time t3 (the stop-charging step), reaching the maximum power that can be provided by the heat engine.

At time t3, the recharging of the battery 40 is stopped.

Between t3 and t4, the power requested by the driver P-DR decreases progressively; battery recharging resumes progressively up to the nominal value of the charge current, in such a way that the total power PF-ETU provided by the ETU does not exceed the maximum power PmaxETU that can be provided by the heat engine 18.

After time t4, the power requested by the driver P-DR plus the power drawn by the electric machine P-REM becomes less than the maximum power PmaxETU that can be provided by the engine. The battery recharge current is again at its nominal value.

Through the use of the control method according to the invention for a hybrid vehicle, the transmission of power through the road optimizes the use of the electric machine 68 located on the rear wheel axle unit of the vehicle and makes it possible to avoid using the front electric machine coupled to the heat engine in the process of recovering energy to recharge the battery. The electrical generation capacity required of the electric machine in front is greatly reduced, since this electrical generation is provided by the rear electric machine.

The cost of the machine is reduced, and it is easier to incorporate (it occupies less space and needs less cooling).

The invention claimed is:

1. Control method for a hybrid vehicle comprising:
a combustion drivetrain comprising a front wheel axle unit, a heat engine coupled by a coupling member to a gearbox intended to transmit vehicle traction power for various gearbox reduction ratios through a front transmission to the front wheel axle unit, and at least one front electric machine coupled to the heat engine, used at least for restarting it,
an electric drivetrain comprising a rear wheel axle unit, and at least one rear electric machine mechanically coupled to the rear wheel axle unit through a rear transmission,
at least one electrical power network connecting the rear electric machine to electrical energy storage means,
a control means for controlling the combustion drivetrain, the electric drivetrain, and the electrical energy storage means, for taking all the vehicle life scenarios into account,
wherein the combustion drivetrain, the electric drivetrain, and the energy storage means are controlled via the control means in order to transmit power provided by the combustion drivetrain to the electric drivetrain, via the road on which the vehicle is traveling, for recharging the energy storage means,
and the method comprises, when the vehicle is in motion and being driven by the heat engine, controlling the rear electric machine so as to draw part of the vehicle's traction power, supplied by the vehicle heat engine, through the rear wheel axle unit of the vehicle, while maintaining the speed and/or acceleration of the vehicle.

2. Control method according to claim 1, comprising:
in a first step, configuring the rear electric machine as an electrical current generator and using the induced resisting torque to transform the resisting torque into electrical power to recharge the energy storage means via the electrical power network;
in a second step, controlling the combustion drivetrain so that it provides the necessary traction power to maintain the speed and acceleration requested by the driver and recharge the energy storage means as well.

3. Control method according to claim 2, comprising controlling the combustion drivetrain so as to offset the resisting torque, the total losses at the front and rear transmissions, and the losses due to the front-wheel and rear-wheel tires.

4. Control method according to claim 3, wherein, when the heat engine is used by the driver at its maximum power potential, the method has a step of stopping the recharging of the energy storage means by the rear electric machine.

5. Control method according to claim 4, wherein the step of stopping the recharging of the energy storage means comprises:
in a first step, controlling the rear electric machine so as to stop drawing resisting torque from the rear wheel axle;
in a second step, controlling the combustion drivetrain so that it provides the necessary traction power to maintain the speed and acceleration requested by the driver.

6. Control method according to claim 2, wherein, when the heat engine is used by the driver at its maximum power potential, the method has a step of stopping the recharging of the energy storage means by the rear electric machine.

7. Control method according to claim 6, wherein the step of stopping the recharging of the energy storage means comprises:
in a first step, controlling the rear electric machine so as to stop drawing resisting torque from the rear wheel axle;
in a second step, controlling the combustion drivetrain so that it provides the necessary traction power to maintain the speed and acceleration requested by the driver.

8. Control method according to claim 1, wherein, when the heat engine is used by the driver at its maximum power potential, the method has a step of stopping the recharging of the energy storage means by the rear electric machine.

9. Control method according to claim 8, wherein the step of stopping the recharging of the energy storage means comprises:
  in a first step, controlling the rear electric machine so as to stop drawing resisting torque from the rear wheel axle;
  in a second step, controlling the combustion drivetrain so that it provides the necessary traction power to maintain the speed and acceleration requested by the driver.

* * * * *